Aug. 21, 1956     W. H. SCHLICHTMANN     2,759,512
AIRPLANE TIRE TREAD
Filed July 14, 1951     2 Sheets-Sheet 1
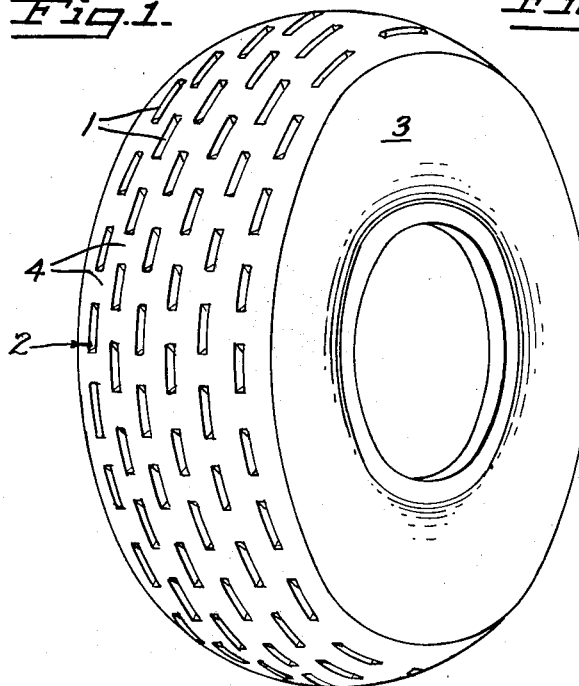
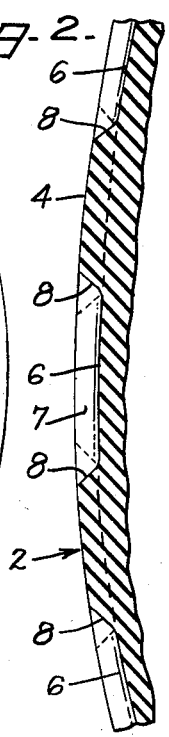
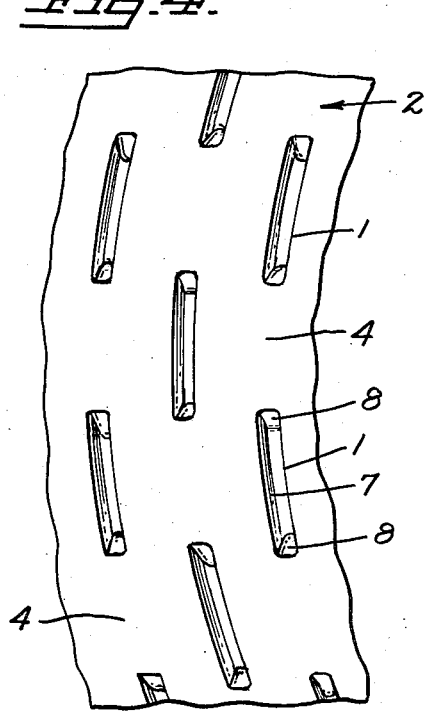
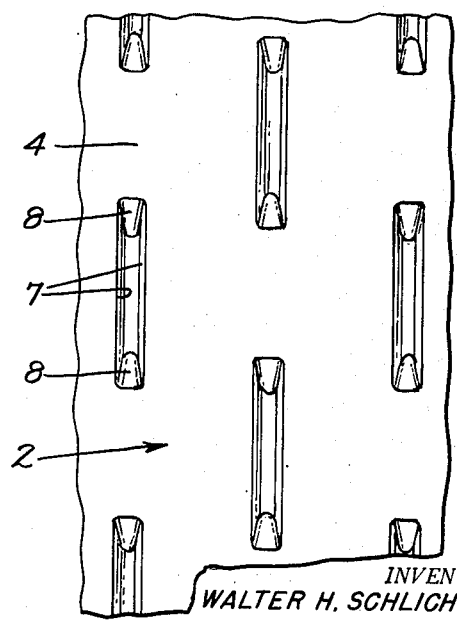
INVENTOR.
WALTER H. SCHLICHTMANN
BY
George B White
ATTORNEY INVENTOR.
WALTER H. SCHLICHTMANN
BY George B White
ATTORNEY

United States Patent Office 2,759,512
Patented Aug. 21, 1956

2,759,512

AIRPLANE TIRE TREAD

Walter H. Schlichtmann, San Francisco, Calif.

Application July 14, 1951, Serial No. 236,783

3 Claims. (Cl. 152—209)

This invention relates to airplane tires and matrix and method for making the same.

The primary object of the invention is to produce an airplane tire in which a plurality of circumferential rows or series of slots are arranged on the crown or tread portion of the tire so that the slots in the adjacent circumferential rows are suitably staggered and vary in length in proportion to the variation of the tread diameter from the middle toward the sides of the tire, the product being a longer wearing tread for pneumatic airplane tires which tread retains approximate compression and displacement advantages of the straight-rib tread designs but prolongs the tread life; the slots being so tapered and formed as to eject rocks, nails and other particles that usually lodge in tire treads.

I am aware that some changes may be made in the general arrangements and combinations of the several devices and parts as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a perspective view of a pneumatic airplane tire constructed in accordance with my invention.

Fig. 2 is a fragmental longitudinal sectional view of the tire.

Fig. 3 is a fragmental cross-sectional view of the tire.

Fig. 4 is a fragmental perspective view of the pneumatic tire showing the slots on a larger scale.

Fig. 5 is a fragmental plane view of the pneumatic tire surface on a larger scale.

Figure 6:
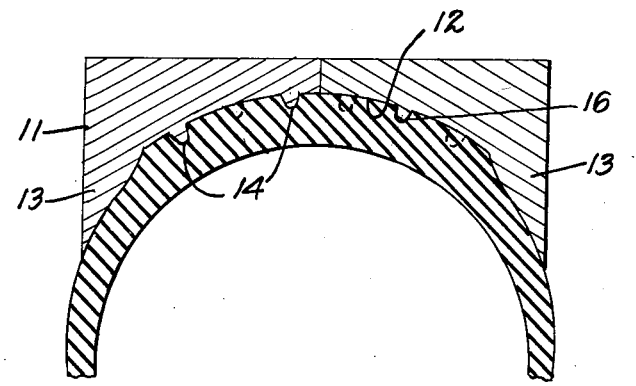
Fig. 6 is a sectional view showing the tire tread in a suitable matrix.
Figure 7:
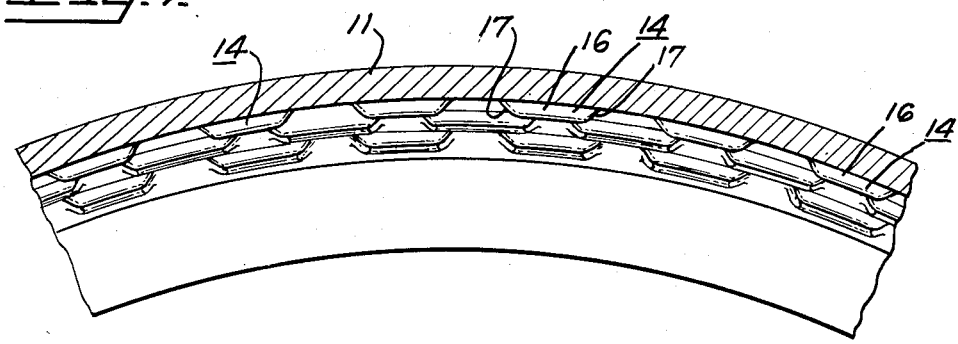
Fig. 7 is a longitudinal sectional view of the matrix for producing said tire.
Figure 8:
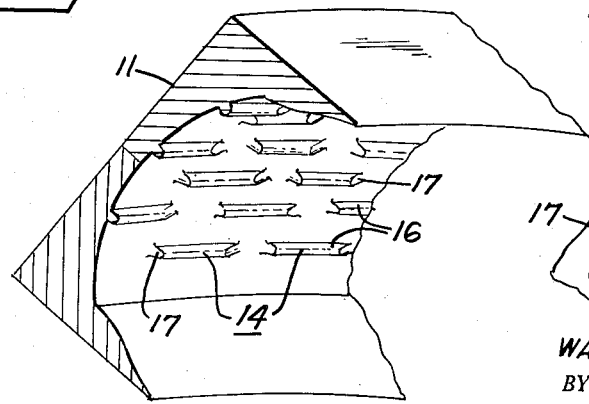
Fig. 8 is a fragmental partly sectional perspective view showing the matrix for forming the slots in said tire.
Figure 9:
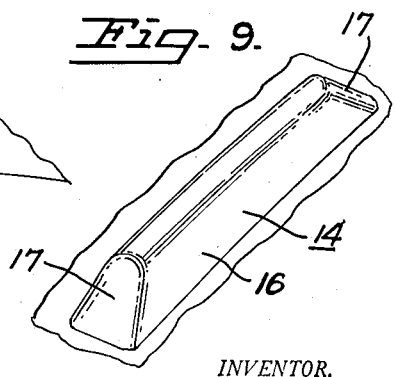
Fig. 9 is a perspective detail view of one of the ribs of the matrix for forming a slot in the tire tread.

Heretofore, there were, in connection with solid tires and certain small size pneumatic tires, some arrangements of grooves and slots of various types in various directions and shapes which were employed primarily for the purpose of providing attractive appearance to the tire while providing friction for the traction surface. Also in the past, arrangement has been made on certain tire designs for providing oval or circular suction cups to reduce the skidding of the tires. But more generally the modern design of airplane tires employed continuous circumferential grooves on the periphery of the tire to form the tread design and the friction surface. These tire designs presented unique problems in connection with airplane tires which are of much larger diameter than the previously used tires on vehicles and which airplane tires are of considerable convexity cross sectionally and pronounced arcuate or curved shape.

In my invention the pneumatic airplane tire is provided with a plurality of circumferential rows or series of circumferentially spaced slots. There are a plurality of such rows or series arranged in parallel spaced relation to one another. The slots 1 on the tread periphery 2 of the tire 3 are so arranged that the slots in the adjacent circumferential rows are staggered relatively to the corresponding slots of the adjacent rows. The circumferential spacing 4 between the adjacent slots 1 of the same series is generally substantially equal to the mean length of the adjacent slot 1. The length of the slots 1 and spacings 4 in the respective circumferential rows or series are gradually reduced from the middle of the tire tread outwardly toward the edges or sides of the tire tread in proportion to the corresponding change or reduction of the diameter of the tire as it varies from the middle toward the side due to the transverse curvature of the crown of the tire. Each row has the same number of slots and of substantially the same width.

Each slot 1 is generally oblong and rectangular and has a bottom 6 from which outwardly diverge parallel side walls 7, and also outwardly diverging end walls 8. This results in a slot of a wider and longer area on its outside than at its bottom. In other words, each slot 1 inclines or tapers at its sides and ends inwardly toward its bottom, the sides and ends being generally in the outline of trapezoids the corners of which are rounded. This particular shape of the slot walls results in a gripping action of each slot under compression when in contact with the landing field and in uniform engagement along the entire width of the tire tread and thus materially reduce lateral side slippage of the tire under forces particularly prevalent in aircraft operation.

The particular outline and cross-sectional shape of each slot 1 also aids in ejecting any solid particle such as a stone, or bolt or the like, that may have lodged in any of said slots 1. The proportionate change of slot length from the middle toward the side rows of the slot equalizes the frictional effect of the tire tread periphery across the entire width.

For the purpose of producing such pneumatic airplane tire I make use of a matrix 11 which extends around the periphery of the tire casing. The tread portion 12 of the matrix is bounded at each end thereof by circumferential side flanges 13 of the usual type. Between the side flanges 13 are formed circumferential and parallel rows of ribs 14. The circumferential spacing between the ribs 14 is also substantially equal to the length of the top of a rib. The circumferential rows are also laterally spaced from one another and the ribs 14 of adjacent rows are so offset that the ribs 14 in the adjacent rows are staggered relatively to one another. The sides 16 of each rib 14 are diverging from the outside toward the matrix. The ends 17 of each rib are also inclined outwardly and toward the base of matrix body.

The ribs 14 of the various rows decrease in length from the middle toward the sides of the matrix in proportion to the shortening of the matrix radius due to the cross-sectional arc or curvature so as to provide substantially the same stagger or overlap and the same number of ribs in each row.

In operation the production of such tires includes the placing of the tire in said matrix and pressing the tread of the tire casing against the matrix and then curing it in the usual manner. After the curing the matrix is removed from the tread and due to the inclined tapering sides of the ribs they can be withdrawn from the corresponding slots of the tire with ease and without tearing the newly formed tread. It is understood that the term "matrix" as used herein includes matrix inserts, molds, bands and other types of impression forming tire vulcanizers.

I claim:

1. In a pneumatic airplane tire, a plurality of circumferential rows of circumferentially spaced elongated slots in the tire tread between the middle and each side of the tire periphery, the slots in each circumferential row being staggered relatively to the slots in the next adjacent row on either side and overlapping the respective ends of the slots in the adjacent row, the length of the slots in each row being equal and varying relatively to the length of the slots in the next adjacent row generally in proportion to the variation of the tire diameter at the locations of the respective rows of slots.

2. In a pneumatic airplane tire, a plurality of circumferential rows of circumferentially spaced elongated slots in the tire tread between the middle and each side of the tire periphery, the slots in each circumferential row being staggered relatively to the slots in the next adjacent row on either side and overlapping the respective ends of the slots in the adjacent row, the circumferential spacing between said slots being substantially equal to the mean length of a slot, the length of the slots in each row being equal and varying relatively to the length of the slots in the next adjacent row generally in proportion to the variation of the tire diameter at the locations of the respective rows of slots.

3. In a pneumatic airplane tire, a plurality of circumferential rows of circumferentially spaced elongated slots in the tire tread between the middle and each side of the tire periphery, the slots in each circumferential row being staggered relatively to the slots in the next adjacent row on either side and overlapping the respective ends of the slots in the adjacent row, the circumferential spacing between said slots being substantially equal to the mean length of a slot, the length of the slots in each row being equal and varying relatively to the length of the slots in the next adjacent row generally in proportion to the variation of the tire diameter at the locations of the respective rows of slots and each of said slots having inclined sides inclining outwardly of said slots and away from one another.

References Cited in the file of this patent

UNITED STATES PATENTS

| | | |
|---|---|---|
| D. 62,422 | Simmons | May 22, 1923 |
| 1,500,307 | Glidden | July 8, 1924 |
| 2,065,697 | Hawkinson | Dec. 29, 1936 |
| 2,275,582 | Bull | Mar. 10, 1942 |
| 2,298,729 | Zimmerman | Oct. 13, 1942 |
| 2,333,588 | Schaevitz | Nov. 2, 1943 |
| 2,415,291 | Kreyer | Feb. 4, 1947 |
| 2,540,044 | Crooker | Jan. 30, 1951 |

FOREIGN PATENTS

| | | |
|---|---|---|
| 290,853 | Great Britain | May 24, 1928 |